Sept. 13, 1938.   J. F. RICHARDSON   2,130,030
PIPE PLUG
Filed Aug. 6, 1936
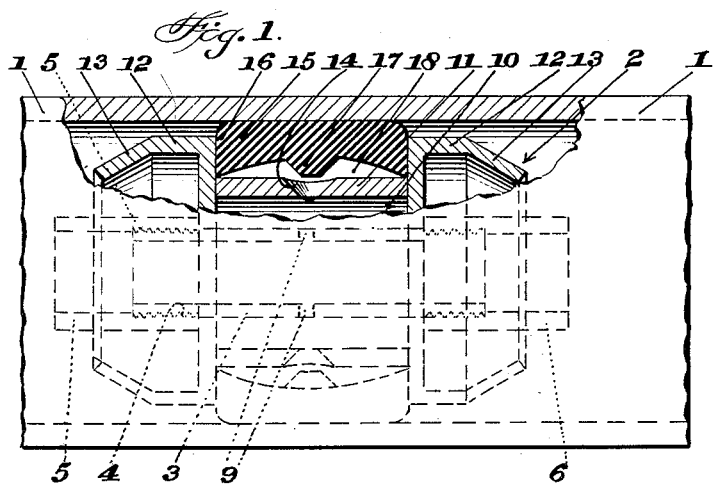
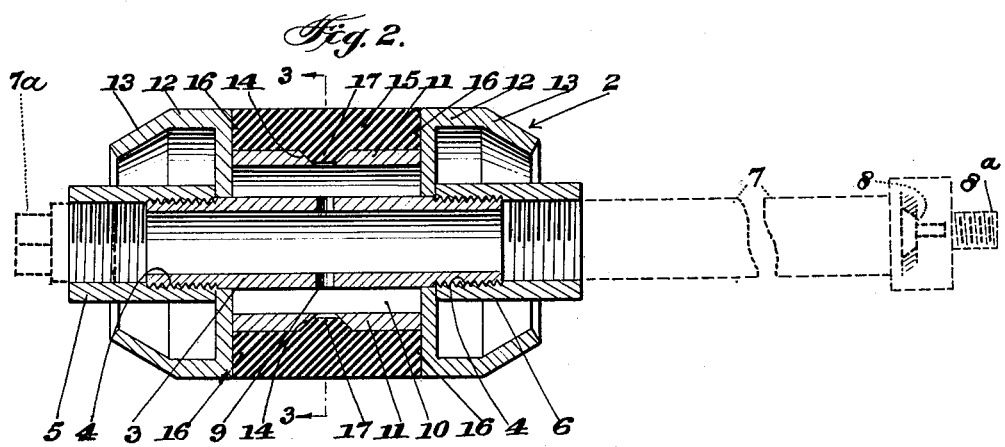
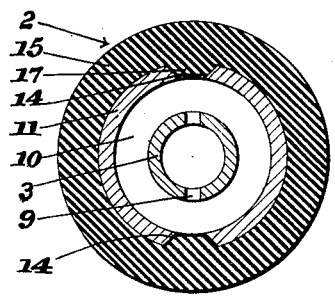
Inventor
J. F. Richardson.
By Munn, Anderson & Liddy
Attorney Patented Sept. 13, 1938

2,130,030

UNITED STATES PATENT OFFICE 2,130,030

PIPE PLUG

James F. Richardson, Ashland, Ky.

Application August 6, 1936, Serial No. 94,654

2 Claims. (Cl. 138—93)

This invention relates to improvements in pipe plugs and its objects are as follow:

First, to provide a plug for stopping up a pipe or other conductor which is suspected of having a leak, so as to confine the pressure fluid, whether liquid or gas, to the affected area and thus more readily discover the place where the leak is located, said plug including an elastic sleeve which is expanded by some externally applied pressure fluid into intimate contact with the bore of the pipe to form a seal.

Second, to make the vent holes in the tubular core of inwardly tapering shape so that none of the pressure fluid will be trapped behind the elastic sleeve to prevent its return to the original position when the pressure is let down.

Third, to vulcanize the ends of the elastic sleeve to the end fittings to make absolutely tight joints past which pressure fluid cannot escape.

Fourth, to provide the plug with pipe couplings which enable the making of a joint outside of the end cups or fittings, said couplings further serving to protect the threads as is pointed out below.

Other objects and advantages will appear in the following specification, reference being had to the accompanying drawing, in which:

Figure 1 is a partial sectional and elevational view showing the improved plug in an operative position in a pipe to be tested.

Figure 2 is a longitudinal section of the pipe plug in its normal condition.

Figure 3 is a cross section taken on the line 3—3 of Figure 2.

The purpose of the instant pipe plug is to quickly and effectively stop the flow of any gas or liquid, usually under pressure, through virtually any kind of a conductor, whether straight or curved. A section of such a conductor, herein designated the pipe, is indicated 1. This pipe is suspected of having a leak and the plug, generally designated 2, is set in position in the pipe preparatory to making a test for the leak. The suspected area is regarded as being at the left of the plug.

The plug comprises a center tube 3 which is externally threaded on each of its ends as at 4. Ordinary pipe couplings 5, 6 are screwed onto these threaded ends and one or the other of the pipe couplings is used for the fastening on of some kind of a contrivance for pushing the plug 2 into the desired position into the pipe 1. Such a contrivance is indicated by the dotted lines 7, and it may consist either of a flexible hose, which will enable pushing the plug around bends, or it may be a rigid tube or rod. The other end is either sealed by a pipe plug 7a or fitted to another and similar pipe plug by flexible rubber hose or solid iron pipe.

It is necessary to end the contrivance 7, if of tubular form, with a check valve 8 which has any suitable means whereby a tube may be attached for the supply of pressure fluid, for example the nipple 8a. As seen in Fig. 2, the contrivance 7 is screwed into the coupling 6, and said contrivance 7 together with its check valve 8 comprise the outside closure means for the pipe plug. The companion coupling 5 is closed by the previously mentioned plug 7a in order to confine the pressure fluid admitted through the check valve 8a. The contrivance 7 can be screwed into the coupling 5, in which event the coupling 6 would be closed by screwing the plug 7a into said coupling 6.

One or more holes 9 in the center tube 3 provide for the escape of pressure fluid into an internal chamber 10 defined by the tube 3, a concentric but spaced tubular core 11, and a pair of end cups or fittings 12 which are of identical shape. These fittings are spaced from each other in the longitudinal direction by the intervening core 11, to the ends of which the fittings are brazed or otherwise secured so as to preserve the concentric relationship of the core 11 to the center tube 3. This makes a unit of the core 11 and the end fittings 12 which is slipped on to the center tube 3 and held in position by the two pipe couplings 5, 6. The remote ends of the fittings 12 are bevelled at 13 to make it easy for the plug to slide over corners, raised places, and joints in the pipe 1.

The core 11 has one or more vent holes 14 which are tapered inwardly as shown. An elastic sleeve 15 surrounds the core 11, its periphery 16 normally being flush with the cylindrical parts of the fittings 12. The sleeve 15 is preferably composed of rubber, but any equivalent elastic material will do as a substitute. In any event its ends 16 are vulcanized or otherwise intimately connected with the adjoining and confronting faces of the fittings 12 so as to make absolutely tight joints past which pressure fluid cannot escape.

Excepting for its sealed ends the elastic sleeve 15 is loose on the core 11. The sleeve has projections 17 which match the form of the vent holes 14 and when the sleeve 15 is relaxed (Fig. 2) the projections 17 occupy the vent holes. The purpose in making the vent holes 14 of inwardly tapering form is to prevent pressure fluid being trapped between the elastic sleeve 15 and the core 11.

The operation is readily understood. One can readily understand that upon securing a rod or corresponding contrivance 7 to one of the couplings 5, 6 the plug 2 can be wielded much on the order as one would wield a swab in a boiler tube. The matter of determining how far to push the plug is something that does not have to be considered here. It is sufficient to understand that a portion of the pipe 1 is suspected of having a leak. Considering the leak to be in the portion of the pipe at the left of the plug 2 (Fig. 1), after the plug has been located and expanded by pressure fluid admitted through the check valve 8, other fluid under pressure is admitted to the pipe 1 at the left end of the pipe plug.

The pressure fluid now contained by the pipe plug escapes through the holes 9 into the chamber 10 where pressure is exerted upon the faces of the projections 17. These are immediately moved out of place, whereupon the internal pressure fluid enters the space 18 (Fig. 1), expanding the elastic sleeve 15 so that every part of it makes intimate contact with the bore of the pipe 1.

As pressure is built up, the sleeve 15 will press against the bore of the pipe all the harder, and the fluid separately applied to the left of the plug under pressure will escape at the leak, the location of which is readily detected upon inspection. After the test is completed the removal of the pressure from within the plug will allow the sleeve 15 to shrink to its original shape (Fig. 2) whereupon the plug 2 is again withdrawn from the pipe.

It is desired to point out that the plug shown in the drawing is only one example of how the principle of the invention can be embodied. In practice plugs will be used in singles, couples, triples or more, depending on how the branches of the conductor to be tested extend. It is easy to see that the pipe 1 can be tested in sections by using two identical plugs in spaced positions in the pipe. The idea is to confine the testing pressure between the plugs and as each section of the pipe is thus tested, the pair will be shifted on to a new place until the entire length of the pipe has been traversed.

I claim:

1. A pipe plug comprising a center tube having a pair of end fittings spaced from each other and secured to the tube to form a unit, a tubular core having its ends secured to the end fittings, said core being spaced from the center tube to provide a chamber, said tube having a hole communicating with the chamber and said core also having a hole, an elastic sleeve loosely encompassing the core, but having its ends permanently and tightly united with the end fittings, and couplings connected with the center tube to hold the aforesaid unit in place on the tube and to provide for the attachment of a wielding contrivance.

2. A pipe plug comprising a center tube, a unit mounted thereon, said unit consisting of end fittings and a tubular core spaced around the tube to provide a chamber, said tube having a hole communicating with the chamber and said core having a hole leading from the chamber, an elastic sleeve encompassing the core and being loose with respect thereto excepting at its ends which are premanently and tightly united with the end fittings, and projections on the sleeve adapted to occupy the hole in the core, said hole being inwardly tapered to prevent the trapping of pressure fluid between the core and sleeve, and means carried by the center tube for both holding the unit in place and for coupling on a wielding contrivance.

JAMES F. RICHARDSON.